(12) United States Patent
Krause et al.

(10) Patent No.: US 7,119,039 B2
(45) Date of Patent: Oct. 10, 2006

(54) TITANIUM DIOXIDE SCOURING MEDIA AND METHOD OF PRODUCTION

(75) Inventors: Claude A. Krause, St. Martinville, LA (US); William Scott Woolfolk, Maurice, LA (US)

(73) Assignee: Carbo Ceramics Inc., Irving, TX (US)

( * ) Notice: Subject to any disclaimer, the term of this patent is extended or adjusted under 35 U.S.C. 154(b) by 2 days.

(21) Appl. No.: 10/837,433

(22) Filed: Apr. 30, 2004

(65) Prior Publication Data
US 2004/0239012 A1  Dec. 2, 2004

Related U.S. Application Data

(63) Continuation-in-part of application No. 10/396,279, filed on Mar. 24, 2003.

(51) Int. Cl.
C09C 1/36 (2006.01)

(52) U.S. Cl. .......................................... 501/134; 51/309

(58) Field of Classification Search ................ 106/428, 106/430, 436; 51/80, 94, 308, 309; 501/134
See application file for complete search history.

(56) References Cited

U.S. PATENT DOCUMENTS

| | | | |
|---|---|---|---|
| 1,567,445 A | | 12/1925 | Lubowsky |
| 2,721,626 A | | 10/1955 | Rick |
| 4,061,596 A | * | 12/1977 | Matsushita et al. .......... 502/439 |
| 4,113,660 A | * | 9/1978 | Abe et al. ..................... 502/84 |
| 4,166,147 A | * | 8/1979 | Lange et al. ................ 428/328 |
| 4,321,224 A | | 3/1982 | Shimizu et al. |
| 4,427,068 A | * | 1/1984 | Fitzgibbon ................ 166/280.2 |
| 4,784,841 A | | 11/1988 | Hartmann et al. |
| 5,510,068 A | | 4/1996 | Parmentier |
| 6,036,999 A | | 3/2000 | Zhao et al. |
| 6,149,712 A | | 11/2000 | Hall et al. |
| 6,660,243 B1 | | 12/2003 | Proft et al. |
| 2004/0187392 A1 | | 9/2004 | Krause et al. |

OTHER PUBLICATIONS

"TiO$_2$ Times," a publication of Kerr-McGee Chemical LLC, Summer/Fall 2001.

* cited by examiner

Primary Examiner—C. Melissa Koslow

(57) ABSTRACT

Round and spherical titanium dioxide scouring media and a method for producing the media are disclosed. The scouring media is effective in removing titanium dioxide buildup on the walls of a titanium dioxide reaction vessel. The method consists of forming green titanium dioxide pellets in a high intensity mixer by mixing commercially available titanium dioxide dust, water and a surfactant. The high intensity mixer produces substantially round, and spherical green pellets which are subsequently sized and sintered in a kiln to form round and spherical titanium dioxide sintered pellets that are suitable as a scouring media. The high intensity mixer allows the operator to closely control the size and shape of the pellets during the forming process to produce substantially round and spherical green pellets. Because the sintered titanium dioxide pellets are substantially round and spherical in shape, they are much less abrasive to the walls of the reaction vessel. Furthermore, as the pellets themselves abrade away, they do not contaminate the titanium dioxide product, and they can even be reprocessed into round and spherical scouring media.

20 Claims, No Drawings

TITANIUM DIOXIDE SCOURING MEDIA AND METHOD OF PRODUCTION

CROSS-REFERENCE TO RELATED APPLICATIONS

This application is a continuation-in-part of prior application Ser. No. 10/396,279 filed Mar. 24, 2003, the entire disclosure of which is incorporated herein by reference.

BACKGROUND

The present invention relates to methods for preparation of substantially round and spherical pellets comprising sintered titanium dioxide. The pellets are useful as a scouring media.

Methods disclosed herein involve mixing titanium dioxide dust, water and at least one surfactant, forming a pellet from the mixture and sintering the pellet to form the titanium dioxide scouring media.

The production of titanium dioxide through the vapor phase oxidation of titanium tetrachloride has become a commonly used process in the production of titanium dioxide pigment. During this process, titanium tetrachloride vapors react with oxygen or air or both at high temperatures in an oxidation reactor. The resultant stream of hot oxidation products exiting the reactor contains titanium dioxide in a finely distributed form suspended in gaseous constituents. The freshly formed titanium dioxide particles, which are present at first as very reactive particles, grow together to form small aggregates having a diameter of less than 0.15 mm. Some of these small aggregates grow larger in size and partly sinter to form larger, hard and unshapely aggregates having a dimension greater than 0.15 mm. These larger aggregates tend to form in a layer and deposit on the surfaces of the hot reaction zone of the oxidation reactor. Continued use of the oxidation reactor and the hot reaction products which pass over it constantly regenerate this layer. Not only does this layer regenerate with continued use of the reactor, but often pieces of this layer break off and are carried away in the reaction mixture. These large particles are not suitable for pigment production and serve to contaminate the reaction mixture.

To prevent the formation of this layer of titanium dioxide particles, scouring media consisting of chemically inert scrubbing solids have been added to the reaction mixture at appropriate locations. Numerous substances have been used as scouring media such as aluminum oxide, zirconium silicate, and silica sand. One of the most commonly used scouring media is silica sand. However, there are disadvantages to the use of silica sand as a scouring media in an oxidation reactor.

Silica sand is somewhat angular in shape. While the angular shape is effective in scouring the walls of the reactor, it also severely wears the inner walls of the reactor. Eventually, the silica sand generates holes in the reactor, which requires repair to, or in some cases replacement of, the reactor. The replacement time could be a matter of weeks, thus severely hampering production.

Furthermore, silica sand particles are easily crushed. The crushed silica sand contaminates the reactor mixture and must be removed from the mixture. If not removed, the silica sand will reduce the quality of the resultant product. Therefore, there exists a need for a scouring media that will be strong and dense enough to effectively scour the titanium dioxide reactor walls but is round and spherical and less abrasive to reduce or eliminate reactor wear. There is also a need for a scouring media that is sized properly to provide adequate separation and recycle and would reduce the potential for contamination of the reactor mixture.

Titanium dioxide has been used as a scouring media to address the disadvantages associated with the use of conventional scouring media. However, the titanium dioxide previously produced for use as scouring media has not eliminated all of the problems associated with other scouring media. For instance, in the process described in U.S. Pat. No. 4,784,841, titanium dioxide scouring particles are produced by vapor phase oxidation of titanium tetrachloride. The particle aggregates initially formed which have a dimension larger than 0.15 mm are separated, admixed with alkaline hydroxides, calcined and returned to the process. This process produces particle aggregates of sizes between 0.2 to 2.0 mm for use as scouring aggregates for the prevention of deposit formation on a heat exchanger. The process disclosed in U.S. Pat. No. 4,784,841, however, fails to control the size and shape of the aggregates formed, and thus fails to reduce the possibility of damage to the reactor walls and fails to maximize separation and recycle/reuse efficiency.

In the process described in U.S. Pat. No. 2,721,626, coarse scouring solids having a dimension ranging from 0.15 to 6.35 mm are admixed with a hot reaction mixture and after cooling separated from the reaction products and used again as scouring solids. The dry separation of the coarse scouring titanium dioxide particles from the finely particulate titanium dioxide is inefficient. Thus, there is always a percentage of coarse scouring solids remaining in the final product thereby reducing the overall efficiency of the process.

SUMMARY

Exemplary methods of the present invention produce a substantially round and spherical titanium dioxide scouring media by controlling the size, strength, density and shape of the titanium dioxide particles. The scouring media produced by the methods of the present invention reduce or eliminate the problems of reactor wear and contamination of the reactor mixture during the titanium dioxide pigment manufacturing process.

In accordance with embodiments of the methods of the present invention, substantially round and spherical pellets comprised primarily of titanium dioxide for use as scouring media are produced. The pellets are initially formed by adding a sufficient amount of water and a sufficient amount of a surfactant to titanium dioxide dust in a high intensity mixer. The high intensity mixer creates substantially round and spherical green pellets which are subsequently sintered to form the final product.

DETAILED DESCRIPTION

Embodiments of the method of the present invention produce a titanium dioxide scouring media in which the size and shape of the titanium dioxide pellets are controlled to produce substantially round and spherical sintered pellets. Titanium dioxide pellets produced by the methods of the present invention are suitable for use as a scouring media, and reduce or eliminate the problems of reactor wear and contamination of the reactor mixture during the titanium dioxide pigment manufacturing process. For the purpose of this patent application, the term "substantially round and spherical" as used in connection with pellets shall mean pellets that measure about 0.8 or more on the Krumbein/Sloss Roundness and Sphericity Chart.

In particular, the present method produces substantially round and spherical sintered pellets from a hydrophobic titanium dioxide starting material. For example, the titanium dioxide dust used as the starting material in embodiments of the present method may have been treated, such as by application of a coating or exposure to ultraviolet radiation, so that the titanium dioxide has a hydrophobic surface. According to one example of the present method, the starting material was titanium dioxide dust having a hydrophobic surface obtained from Kerr McGee Corporation. According to other examples of the present method, hydrophobic titanium dioxide dust can be obtained from any of a number of commercial sources.

According to another example of the present method, green pellets are produced by mixing a starting material comprising a sufficient amount of hydrophobic titanium dioxide dust, a sufficient amount of water, and a sufficient amount of at least one surfactant in a high intensity mixer. The term "sufficient amount" describes that amount of hydrophobic starting material, water and surfactant, respectively, that is necessary for pellets to be formed upon mixing.

Particularly, however, a "sufficient amount" of surfactant according to the present method can be further defined as a surface tension reducing amount. A surface tension reducing amount is that amount sufficient to lower the surface tension of the hydrophobic titanium dioxide dust starting material to a surface tension such that pellets will form upon mixing the hydrophobic titanium dioxide dust with the surfactant and water.

Those of ordinary skill in the art will recognize that the specific amounts of water and surfactant that will constitute a "sufficient amount" depends on the amount of hydrophobic starting material. According to one example of the present method, green titanium dioxide pellets are prepared by mixing, in a high intensity mixer, about 300 pounds of titanium dioxide dust with water in an amount of from about 6.5 to about 7.5 gallons of water and at least one surfactant in an amount of from about 2.5 to about 4.5 milliliters. In examples of the present method where a remix is employed, green titanium dioxide pellets are prepared as described above and at least a portion of the green pellets are returned to the high intensity mixer and mixed with about 300 pounds of titanium dioxide dust and about 4.5 to about 5.5 gallons of water. In certain examples employing such a remix, surfactant is not added to the remix.

According to embodiments of the present invention, the hydrophobic starting material used in the present method is a hydrophobic titanium dioxide dust containing at least about 90% titanium dioxide, or at least about 95% titanium dioxide, or at least about 98% titanium dioxide. The degree of hydrophobicity of the starting material can be any value.

According to embodiments of the present invention, the water is fresh water.

Generally, surfactants are water-soluble surface-active agents. All surfactants possess the common property of lowering surface tension when added to water. Surface tension is a measure of the amount of energy needed to expand the surface area of a liquid. A surfactant is typically comprised of a hydrophobic portion, for example a long alkyl chain, attached to hydrophilic or water-solubility-enhancing functional groups. Surfactants can be categorized according to the charge present in the hydrophilic portion of the molecule (after dissociation in aqueous solution) as follows: anionic surfactants; nonionic surfactants; cationic surfactants; and ampholytic surfactants.

Exemplary surfactants include but are not limited to saturated or unsaturated long-chain fatty acids or acid salts, long-chain alcohols, polyalcohols, dimethylpolysiloxane and polyethylhydrosiloxane. More particular exemplary surfactants include but are not limited to linear and branched carboxylic acids and acid salts having from about 4 to about 30 carbon atoms; linear and branched alkyl sulfonic acids and acid salts having from about 4 to about 30 carbon atoms; linear alkyl benzene sulfonate wherein the linear alkyl chain includes from about 4 to about 30 carbon atoms; sulfosuccinates; phosphates; phosphonates; phospholipids; ethoxylated compounds, carboxylates, sulfonates and sulfates, polyglycol ethers, amines, salts of acrylic acid, pyrophosphate and mixtures thereof. Still more particular exemplary surfactants include but are not limited to sodium stearate; octadecanoic acid; hexadecyl sulfonate; lauryl sulfate; sodium oleate; and combinations thereof.

Suitable surfactants for use in the present method include anionic and nonionic surfactants. According to certain examples of the present method, a suitable surfactant is a detergent, such as a dishwashing liquid commercially available from the Proctor & Gamble Company under the tradename Dawn®. Other dishwashing liquids commercially available from the Proctor & Gamble Company under tradenames such as Joy® and Ivory® may also be suitable for use. Still other commercially available dishwashing liquids, powders and gels, as well as other forms of surfactants may be used in the present methods.

According to certain examples, a small amount of a binding agent is mixed with the titanium dioxide dust, water and surfactant, to help hold the pellets together during the pelletizing phase. This binding agent can be added at any stage prior to pelletizing, but according to certain embodiments is added at the grinding stage to ensure intimate mixture with the titanium dioxide dust. The binding agents are organic in nature, such as PVA or starch, which allows the binding agent to burn off during the sintering phase. According to certain embodiments of the present invention, starch is the binding agent, and the amount that is added is about 0.5% of the dry weight of the titanium dioxide dust starting material.

The pelletizing process for making titanium dioxide pellets from a hydrophobic starting material as described herein is quite similar to a process for making ceramic proppants which is described in U.S. Pat. No. 4,427,068, the entire disclosure of which is hereby incorporated herein by reference. According to one example of the present method, sintered, spherical pellets of titanium dioxide are made from a hydrophobic titanium dioxide starting material as follows.

EXAMPLE 1

About 300 pounds of a titanium dioxide dust obtained from Kerr McGee Corporation's plant in Savannah, Ga. is added to a high intensity mixer commercially available from Eirich Machines, Inc., and known as the Eirich Mixer. A mixer of this type is provided with a horizontal or inclined circular table, which can be made to rotate at a speed of from about 10 to about 60 revolutions per minute (rpm), and is provided with a rotatable impacting impeller, which can be made to rotate at a tip speed of from about 5 to about 50 meters per second. The direction of rotation of the table is opposite that of the impeller, causing material added to the mixer to flow over itself in countercurrent manner. The central axis of the impacting impeller is generally located within the mixer at a position off center from the central axis of the rotatable table. The table may be in a horizontal or inclined position, wherein the incline, if any, is between 0 and 35 degrees from the horizontal.

The titanium dioxide dust obtained from Kerr McGee's plant in Savannah has at least a hydrophobic surface. While the titanium dioxide dust is being stirred, water and at least one surfactant is added to the mixer in an amount sufficient to cause formation of essentially spherical pellets of the desired size. In this particular example, the water is fresh water, and the amount of water added is about 7.0 gallons, although this amount can range from about 6.5 to about 7.5 gallons when starting with about 300 pounds of titanium dioxide dust. In general, however, the quantity of water used in the present methods is that amount which is sufficient to cause essentially spherical pellets of titanium dioxide to form upon mixing. The surfactant in this particular example is Dawn® dishwashing detergent, and the amount of surfactant added is about 2.5 to about 4.5 milliliters. In general, however, the amount of surfactant used in the present methods is that amount sufficient to reduce the surface tension of the titanium dioxide dust to a surface tension such that pellets will form upon mixing the titanium dioxide dust with the surfactant and water.

The table is rotated at from about 20 to about 40 rpm, and the impacting impeller is rotated to obtain a tip speed of about 28 meters per second (about 1136 rpm). In general, however, the tip speed according to the present example can be in a range of from about 25 to about 35 meters per second. According to the present example, the impeller is initially rotated at about 14 meters per second (about 568 rpm), during addition of one-half of the amount of water, and subsequently rotated at the higher tip speed of about 28 meters per second. The initial rotation of the impeller is optional. If employed, the initial rotation can be from about 5 to about 20 meters per second.

The rate of water addition to the mixer is not critical. The intense mixing action disperses the water throughout the particles. The total mixing time in this example is from about 2 to about 6 minutes. Typically, after pellets form in the mixer, the pellets are dried, for example, by a dryer, to provide sufficient green strength for screening.

In this particular example, the drying temperature is about 85° C. In general, however, the drying temperature can range from about 65° C. to about 121° C. The dried pellets are screened to remove pellets that are under and over a desired size, which in this example is about −8/+25 mesh. The dried pellets having the desired size are sent to a rotary kiln for sintering.

In this particular example, the sintering temperature is about 1015° C. In general, however, the sintering temperature used in the present method is in the range of from about 938° to about 1121° C.

In this particular example, the resulting titanium dioxide pellets have a density of about 1.66 g/cc. In general, the present method can be used to make titanium dioxide pellets having a bulk density of from about 1.55 g/cc to about 1.85 g/cc. The density of the pellets can be adjusted by controlling the sintering process, as is described further below.

In this example, the sintered pellets are screened to a desired size, which in this example is that about 90% of the sintered pellets will pass through a top screen of 10 mesh and be retained on a bottom screen of 30 mesh. In general, however, the sintered pellets can be screened to a larger or smaller size by adjusting the screen sizes to obtain a desired size. The sintered pellets according to the present example exhibit a crush of less than about 40% at 4000 p.s.i., as measured by the American Petroleum Institute crush test for proppant.

Manipulations

The density and strength of the sintered pellets according to the present method are controlled through the sintering process and can be adjusted as required. For example, in a range of sintering temperatures of from about 938° C. to about 1121° C., pellets sintered at temperatures in the upper range have a greater density and greater strength then pellets sintered at temperatures in the lower range. In other words, higher sintering temperatures produce stronger and more dense pellets.

Thus, by manipulating the sintering temperature, the properties of the pellets can be manipulated, which may be beneficial in providing pellets having a particular property for use in a given application. For example, sintering temperatures around the lower end of the range, for example, 938° C., will produce pellets of lower density and lower strength than pellets sintered at a higher temperature in the range. As yet another example, sintering temperatures less than the 1015° C. employed in Example 1 are expected to produce sintered pellets having a density and strength less than the density of the sintered pellets of Example 1. Thus, pellets sintered at temperatures less than 1015° C. are expected to have a density less than about 1.66 g/cc. As compared to pellets of higher density and strength, such pellets of lower density and lower strength will wear less on the tubes of the reactor, but will have lower scour efficiency.

In contrast, sintering temperatures around the upper end of the range, for example, 1121° C., will produce pellets having higher strength and density than those pellets sintered at lower temperatures. As yet another example, sintering temperatures greater than the 1015° C. employed in Example 1 are expected to produce sintered pellets having a density and strength greater than the sintered pellets of Example 1. Thus, pellets sintered at temperatures greater than 1015° C. are expected to have a density greater than about 1.66 g/cc. As compared to pellets of lower density and strength, such pellets of higher strength and density will have more scour efficiency, but will result in more wear on the reactor tubes.

The strength, density, size and shape of the pellets produced according to the present method help solve the problems evident in the prior art relating to reactor wear and contamination of the reactor mixture during the titanium dioxide pigment manufacturing process.

In the process of scouring the reactor tubes, the titanium dioxide scouring media wears away through attrition of the particles upon impact with the tube walls. Some of the scouring media will be fine enough to pass through the system and be included in the salable titanium dioxide product. Some of the attrited material will be coarse enough to be recycled as scouring media. However, some of the material will be too coarse for sale and too fine for use as a scouring media. One significant advantage of this product is that this intermediate sized material can be reprocessed into round and spherical scouring media, thereby eliminating waste and disposal problems. The reprocessing is accomplished by grinding the attrited titanium dioxide to a fine powder, and re-pelletizing it in the same manner as with fresh titanium dioxide. The ground titanium dioxide can be reprocessed by itself or mixed with fresh titanium dioxide dust.

It will be obvious to those skilled in the art that the invention described herein can be essentially duplicated by making minor changes in the material content or the method of manufacture. To the extent that such material or methods are substantially equivalent, it is intended that they be encompassed by the following claims.

The invention claimed is:

1. A method for producing substantially round and spherical titanium dioxide scouring media comprising:
   (a) mixing water, hydrophobic titanium dioxide dust and at least one surfactant in a high intensity mixer, wherein the at least one surfactant is present in a surface-tension reducing amount sufficient to enable substantially round and spherical green pellets comprising titanium dioxide to form upon mixing of the water, the hydrophobic titanium dioxide dust and the at least one surfactant;
   (b) drying the titanium dioxide green pellets; and
   (c) sintering the dried titanium dioxide pellets.

2. The method according to claim 1 further comprising mixing a binder with the water, the titanium dioxide dust and the at least one surfactant to form the green pellets.

3. The method according to claim 1 wherein the green pellets are dried at a temperature ranging from about 65° C. to about 121° C.

4. The method according to claim 1 wherein the green pellets are sintered from about 938° C. to about 1121° C.

5. The method according to claim 1 further comprising screening the green pellets prior to sintering.

6. The method according to claim 1 further comprising screening the sintered pellets.

7. The method according to claim 1 wherein the at least one surfactant comprises at least one of a cationic surfactant and an ampholytic surfactant.

8. The method according to claim 1 wherein the at least one surfactant is selected from the group consisting of saturated long-chain fatty acids or acid salts, unsaturated long-chain fatty acids or acid salts, long-chain alcohols, polyalcohols, dimethylpolysiloxane and polyethylhydrosiloxane.

9. The method according to claim 1 wherein the at least one surfactant is selected from the group consisting of linear and branched carboxylic acids and acid salts having from about 4 to about 30 carbon atoms; linear and branched alkyl sulfonic acids and acid salts having from about 4 to about 30 carbon atoms; linear alkyl benzene sulfonate wherein the linear alkyl chain includes from about 4 to about 30 carbon atoms; sulfosuccinates; phosphates; phosphonates; phospholipids; ethoxylated compounds, carboxylates, sulfonates and sulfates, polyglycol ethers, amines, salts of acrylic acid, pyrophosphate and mixtures thereof.

10. The method according to claim 1 wherein the at least one surfactant is selected from the group consisting of sodium stearate; octadecanoic acid; hexadecyl sulfonate; lauryl sulfate; sodium oleate; and combinations thereof.

11. The method according to claim 1 wherein the at least one surfactant comprises at least one of an anionic surfactant and a nonionic surfactant.

12. The method according to claim 1 wherein the amount of hydrophobic titanium dioxide dust comprises about 300 pounds of the hydrophobic titanium dioxide dust, the amount of water comprises about 6.5 to about 7.5 gallons of water, and the amount of the at least one surfactant comprises about 2.5 to about 4.5 milliliters of the at least one surfactant.

13. The method according to claim 1 wherein the sintered pellets have a crush strength of less than about 40% at 4000 psi.

14. The method according to claim 1 wherein the sintered pellets have a density of about 1.66 g/cc.

15. The method according to claim 1 wherein the sintering is performed at a temperature of about 1015° C.

16. The method according to claim 1 wherein the sintering is performed at a temperature of about 1015° C., and the sintered pellets have a crush strength of less than about 40% at 4000 psi and a density of about 1.66 g/cc.

17. The method according to claim 1 wherein the sintered pellets have a density of from about 1.55 g/cc to about 1.85 g/cc.

18. The method according to claim 1 wherein the sintering of the dried titanium dioxide pellets further comprises manipulating a property of the dried titanium dioxide pellets selected from the group consisting of density and crush strength, which manipulation is achieved by controlling sintering temperature in a range of from about 938° C. to about 1121° C.

19. The method according to claim 18 wherein the sintering temperature is in a range of from about 938° C. to about 1015° C., and the sintered pellets have a density of less than about 1.66 g/cc.

20. The method according to claim 18 wherein the sintering temperature is in a range of from about 1015° C. to about 1121° C., and the sintered pellets have a density of greater than about 1.66 g/cc.

* * * * *